United States Patent
Kondo et al.

(10) Patent No.: US 11,892,536 B2
(45) Date of Patent: Feb. 6, 2024

(54) OBJECT-DETECTING DEVICE

(71) Applicant: DENSO CORPORATION, Kariya (JP)

(72) Inventors: Katsuhiko Kondo, Nisshin (JP); Yasuyuki Miyake, Kariya (JP)

(73) Assignee: DENSO CORPORATION, Kariya (JP)

( * ) Notice: Subject to any disclaimer, the term of this patent is extended or adjusted under 35 U.S.C. 154(b) by 512 days.

(21) Appl. No.: 17/192,577

(22) Filed: Mar. 4, 2021

(65) Prior Publication Data
US 2021/0190934 A1 Jun. 24, 2021

Related U.S. Application Data (63) Continuation of application No. PCT/JP2019/034987, filed on Sep. 5, 2019.

(30) Foreign Application Priority Data

Sep. 6, 2018 (JP) .................................. 2018-166853

(51) Int. Cl.

| G01S 13/70 | (2006.01) |
| G01S 13/04 | (2006.01) |
| G01S 17/04 | (2020.01) |
| G01S 15/04 | (2006.01) |

(Continued)

(52) U.S. Cl.
CPC .............. *G01S 13/70* (2013.01); *G01S 13/04* (2013.01); *G01S 15/04* (2013.01); *G01S 15/66* (2013.01); *G01S 17/04* (2020.01); *G01S 17/66* (2013.01)

(58) Field of Classification Search
CPC .......... G01S 13/70; G01S 13/04; G01S 17/04; G01S 15/04; G01S 15/66; G01S 17/66; G01S 7/40; G01S 7/4026; G01S 7/403; G01S 7/4034
See application file for complete search history.

(56) References Cited

U.S. PATENT DOCUMENTS 9,129,211 B2 * 9/2015 Zeng ....................... G06F 30/20
9,152,526 B2 * 10/2015 Zeng .................... G06F 11/3055
9,274,525 B1 * 3/2016 Ferguson ............ G01S 7/52004

(Continued)

FOREIGN PATENT DOCUMENTS

JP 2015-078925 A 4/2015

*Primary Examiner* — Peter M Bythrow
(74) *Attorney, Agent, or Firm* — MASCHOFF BRENNAN (57) ABSTRACT

An object-detecting device includes a first detector, an object tracker, a second detector, and an axial misalignment determiner. The first detector detects a distance between a moving body and an object and an orientation of the object relative to the moving body based on detection information acquired from detection sensors including a search wave sensor that searches a detection region with a search wave. The object tracker tracks the same object passing through a different detection region based on the detection information. The second detector detects at least either one of a height of the object or a lateral distance of the object as object information based on the detection information. The axial misalignment determiner determines whether axial misalignment has occurred in the search wave sensor based on the distance and the orientation of the object detected by the first detector based on the detection information from the search wave sensor and the object information detected in a different detection region by the second detector.

10 Claims, 5 Drawing Sheets

(51) Int. Cl.
G01S 15/66 (2006.01)
G01S 17/66 (2006.01)

(56) References Cited

U.S. PATENT DOCUMENTS

| | | | |
|---|---|---|---|
| 10,582,121 B2* | 3/2020 | Kamilov | G01S 13/89 |
| 2004/0073360 A1* | 4/2004 | Foxlin | G01C 21/188 |
| | | | 342/357.31 |
| 2007/0073473 A1* | 3/2007 | Altan | G01S 13/862 |
| | | | 701/518 |
| 2008/0300787 A1* | 12/2008 | Zeng | G01S 13/931 |
| | | | 701/301 |
| 2018/0321378 A1* | 11/2018 | Sudhakar | G01S 13/4454 |
| 2018/0341007 A1* | 11/2018 | Fetterman | G01S 13/931 |
| 2019/0072646 A1* | 3/2019 | Zelený | G01S 7/4004 |
| 2019/0187250 A1* | 6/2019 | Ru | G01S 7/4052 |
| 2020/0019160 A1* | 1/2020 | McArthur | G01S 17/87 |
| 2020/0033444 A1* | 1/2020 | Marsch | G01S 13/931 |
| 2021/0302534 A1* | 9/2021 | Kellner | G01S 7/403 |

* cited by examiner

OBJECT-DETECTING DEVICE

CROSS-REFERENCE TO RELATED APPLICATION

This application is the U.S. bypass application of International Application No. PCT/JP2019/034987, filed on Sep. 5, 2019, which designated the U.S. and claims priority to Japanese Patent Application No. 2018-166853, filed on Sep. 6, 2018, the contents of both of which are incorporated herein by reference.

TECHNICAL FIELD

The present disclosure relates to a technology for determining axial misalignment of a search wave sensor that searches a detection region in the vicinity of a moving body with a search wave.

BACKGROUND

A search wave sensor is installed in a moving body such as a vehicle, and the search wave sensor performs irradiation of a detection region in the vicinity of the moving body around a detection axis with a search wave to detect a distance to an object present in the detection region and an orientation of the object relative to the moving body. Misalignment of the detection axis of the search wave sensor causes the orientation of the object to be incorrectly detected, so that it is necessary to determine whether the detection axis of the search wave sensor is misaligned.

SUMMARY

An object-detecting device in an aspect of the present disclosure includes a first detector, an object tracker, a second detector, and an axial misalignment determiner.

The first detector detects, based on detection information acquired from each of a plurality of detection sensors installed in a moving body and having different detection regions for detection targets in a vicinity of the moving body, a distance between the moving body and an object present in the detection region and an orientation of the object relative to the moving body, the detection sensors including at least one search wave sensor that searches the detection region around a detection axis with a search wave.

Based on the detection information, the object tracker tracks the same object that passes through the different detection regions as the moving body travels. Based on the detection information, the second detector detects at least either one of a height of the object tracked by the object tracker or a lateral distance between the moving body and the object in a lateral direction as object information.

Regarding the same object tracked by the object tracker, the axial misalignment determiner determines whether the detection axis of the search wave sensor is misaligned based on the distance and the orientation of the object detected by the first detector, which are based on the detection information from the search wave sensor and the object information detected in the detection region different from the detection region of the search wave sensor by the second detector.

BRIEF DESCRIPTION OF THE DRAWINGS

The above features and advantages of the present disclosure will be made clearer by the following detailed description, given referring to the appended drawings. In the accompanying drawings.

DETAILED DESCRIPTION OF THE PREFERRED EMBODIMENTS

For example, JP 2015-78925 A describes a technology in which in a case where an object is present in an overlap region where detection regions of a plurality of search wave sensors that search a vicinity of a moving body with a search wave, such as a laser radar, a millimeter-wave radar, and a sonar, overlap, it is determined, based on a position of the object detected in the overlap region by each of the search wave sensors, whether a detection axis of the search wave sensor is misaligned.

In the technology described in JP 2015-78925 A, it is to be determined, based on a difference between a correct position of an object detected in the overlap region by a first search wave sensor among the plurality of search wave sensors and a position of the same object detected in the overlap region by a second search wave sensor, whether a detection axis of the second search wave sensor is misaligned.

However, as a result of detailed studies by the inventors, it has been found that the technology described in JP 2015-78925 A is disadvantageous in that if no object is present in the overlap region where the detection regions of the plurality of search wave sensors overlap, it cannot be determined whether the detection axis of the search wave sensor is misaligned.

An object of the present disclosure is to provide a technology in which axial misalignment of a search wave sensor is determined based on detection information regarding an object passing through non-overlapping detection regions of a plurality of detection sensors including the search wave sensor as a moving body travels.

An object-detecting device in an aspect of the present disclosure includes a first detector, an object tracker, a second detector, and an axial misalignment determiner.

The first detector detects, based on detection information acquired from each of a plurality of detection sensors installed in a moving body and having different detection regions for detection targets in a vicinity of the moving body, a distance between the moving body and an object present in the detection region and an orientation of the object relative to the moving body, the detection sensors including at least one search wave sensor that searches the detection region around a detection axis with a search wave.

Based on the detection information, the object tracker tracks the same object that passes through the different detection regions as the moving body travels. Based on the detection information, the second detector detects, at least either one of a height of the object tracked by the object tracker or a lateral distance between the moving body and the object in a lateral direction as object information.

Regarding the same object tracked by the object tracker, the axial misalignment determiner determines whether the detection axis of the search wave sensor is misaligned based on the distance and the orientation of the object detected by the first detector, which are based on the detection information from the search wave sensor and the object information detected in the detection region different from the detection region of the search wave sensor by the second detector.

By virtue of such a configuration, axial misalignment of the detection axis of the search wave sensor is determined based on, regarding the same object, the distance and the orientation of the object detected based on the detection information from the search wave sensor and the object information indicating at least either one of the height of the object and the lateral distance between the moving body and the object in the lateral direction detected based on the detection information from the detection sensor different in detection region from the search wave sensor.

In other words, an overlap between the detection region of the search wave sensor that detects the distance and the orientation of the object and the detection region of another detection sensor that detects the object information indicating at least either one of the height of the object and the lateral distance of the object is not necessary for determining whether the detection axis of the search wave sensor is misaligned.

Therefore, axial misalignment of a search wave sensor can be determined based on detection information regarding an object passing through non-overlapping detection regions of a plurality of detection sensors including the search wave sensor as the moving body travels.

An embodiment of the present disclosure will be described below with reference to the drawings.

1. Configuration

Figure 1:
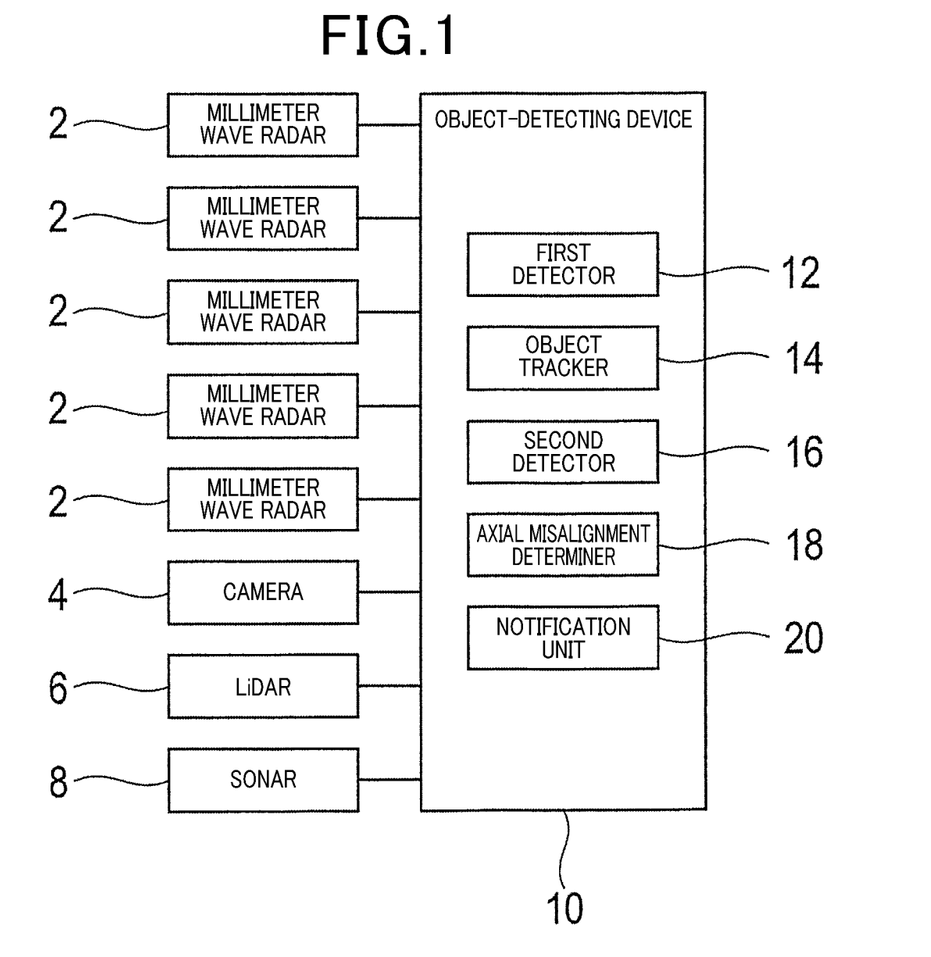
FIG. 1 is a block diagram showing an object-detecting device.

An object-detecting device 10 shown in FIG. 1 is installed in a moving body such as a vehicle or a mobile robot to detect an object present in the vicinity of the moving body. Description will be made below with a vehicle taken as an example of the moving body.

The object-detecting device 10 mainly includes a known microcomputer including a CPU, a RAM, a ROM, and a semiconductor memory such as a flash memory, which are not shown. A variety of functions of the object-detecting device 10 are implemented when the CPU executes a computer program stored in a non-transitory tangible storage medium.

In the object-detecting device 10 of the present disclosure, the semiconductor memory corresponds to the non-transitory tangible storage medium in which the program is stored. Further, with the program executed, a method corresponding to the program is performed. It should be noted that object-detecting device 10 may include a single microcomputer or a plurality of microcomputers.

The object-detecting device 10 includes, as components for a function implemented when the CPU executes the program, a first detector 12, an object tracker 14, a second detector 16, an axial misalignment determiner 18, and a notification unit 20.

Means for implementing these elements that constitute the object-detecting device 10 is not limited to software and a part or all of the elements may be implemented by a piece of or a plurality of pieces of hardware. For example, in a case where the above-described function is implemented by an electronic circuit, which is hardware, the electronic circuit may be implemented by a digital circuit including a number of logic circuits or an analog circuit or by a combination thereof.

The first detector 12 acquires detection information from five millimeter-wave radars 2, a camera 4, a LiDAR 6, and a sonar 8, that is, detection sensors detection targets of which are different detection regions in the vicinity of the vehicle. LiDAR is an abbreviation for Light Detection and Ranging. The different detection regions do not necessarily refer to regions that do not overlap each other at all and the regions may at least partly overlap.

Out of the detection sensors, the five millimeter-wave radars 2 applies electromagnetic waves as a search wave, the LiDAR 6 applies a laser as a search wave, and the sonar 8 applies an ultrasonic wave as a search wave. In other words, the millimeter-wave radars 2, the LiDAR 6, and the sonar 8 are search wave sensors.

Figure 2:
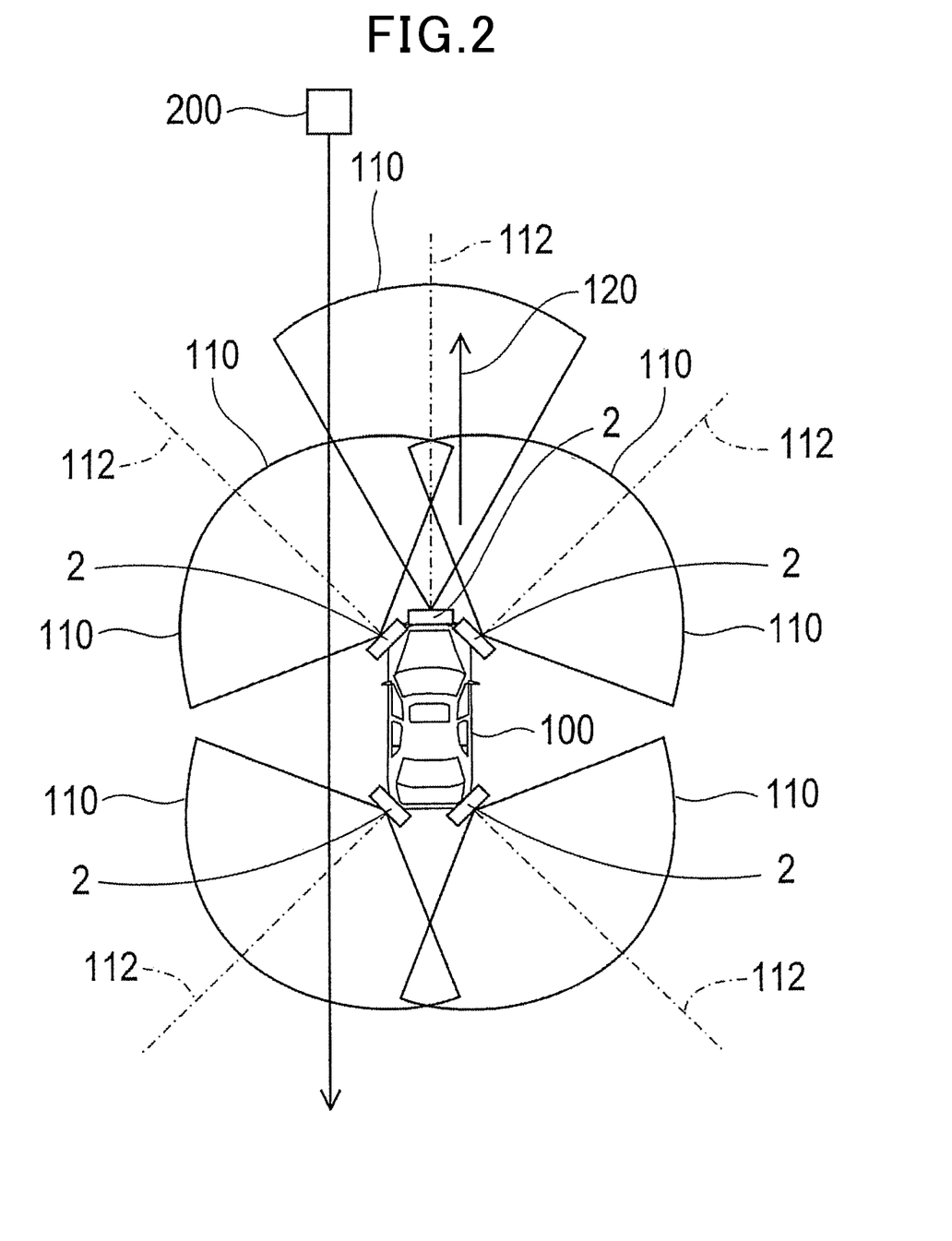
FIG. 2 is a schematic diagram showing a relationship between a detection region of a detection sensor and a position of an object.

As shown in FIG. 2, the five millimeter-wave radars 2 are located at, for example, a front-side middle, front-side right and left, and rear-side right and left of a vehicle 100, respectively. Detection regions 110 in which the five millimeter-wave radars 2 search the vicinity of the vehicle around respective detection axes 112 partly overlap but are different regions.

Thus, in a case where the vehicle 100 travels forward as shown by an arrow 120 in FIG. 2, an object 200 present in front of the vehicle 100 passes through the respective detection regions 110 of the millimeter-wave radar 2 at the front-side middle, the millimeter-wave radar 2 at the front-side left, and the millimeter-wave radar 2 at the rear-side left in sequence, being detected by the millimeter-wave radars 2. The object 200 is a stationary object. It should be noted that the camera 4, the LiDAR 6, and the sonar 8 are not shown in FIG. 2.

The first detector 12 detects a distance between the vehicle 100 and the object 200 present in the detection region 110 in the vicinity of the vehicle 100 and an orientation of the object 200 relative to the vehicle 100 based on the detection information acquired from the above-described various detection sensors. Further, the first detector 12 detects a relative speed of the object 200 relative to the vehicle 100 based on the detection information acquired from the millimeter-wave radars 2.

The object tracker 14 tracks the object 200, which can be identified as the same object based on the detection information from the detection sensors, with the travel of the vehicle 100. For example, the object tracker 14 estimates a position of the object 200 reached after the elapse of predetermined time based on the distance to the object 200, the orientation of the object 200, and the relative speed, which includes a travel direction, of the object 200 relative to the vehicle 100. The object tracker 14 then identifies the object 200 present at a position that matches the estimated position of the object 200 reached after the elapse of the predetermined time as the same object 200.

The second detector 16 detects, based on the detection information acquired from the detection sensors, at least either one of a height of the object 200 tracked by the object tracker 14 or a lateral distance between the vehicle 100 and the object 200 in a lateral direction as object information.

The axial misalignment determiner 18 determines whether the detection axis of each of the search wave sensors is misaligned based on the distance and the orientation of the object 200 detected by the first detector 12 based on the detection information from the search wave sensor and the object information detected in another detection region different from the detection region of the search wave sensor by the second detector 16. If an axial misalignment angle of the detection axis of the search wave sensor is equal to or larger than a predetermined angle, the axial misalignment determiner 18 determines that axial misalignment of the search wave sensor has occurred.

When the axial misalignment determiner 18 determines that the axial misalignment of the search wave sensor has occurred, the notification unit 20 performs notification of axial misalignment abnormality by showing the axial misalignment on a display, by voice, or the like.

2. Process

Figure 3:
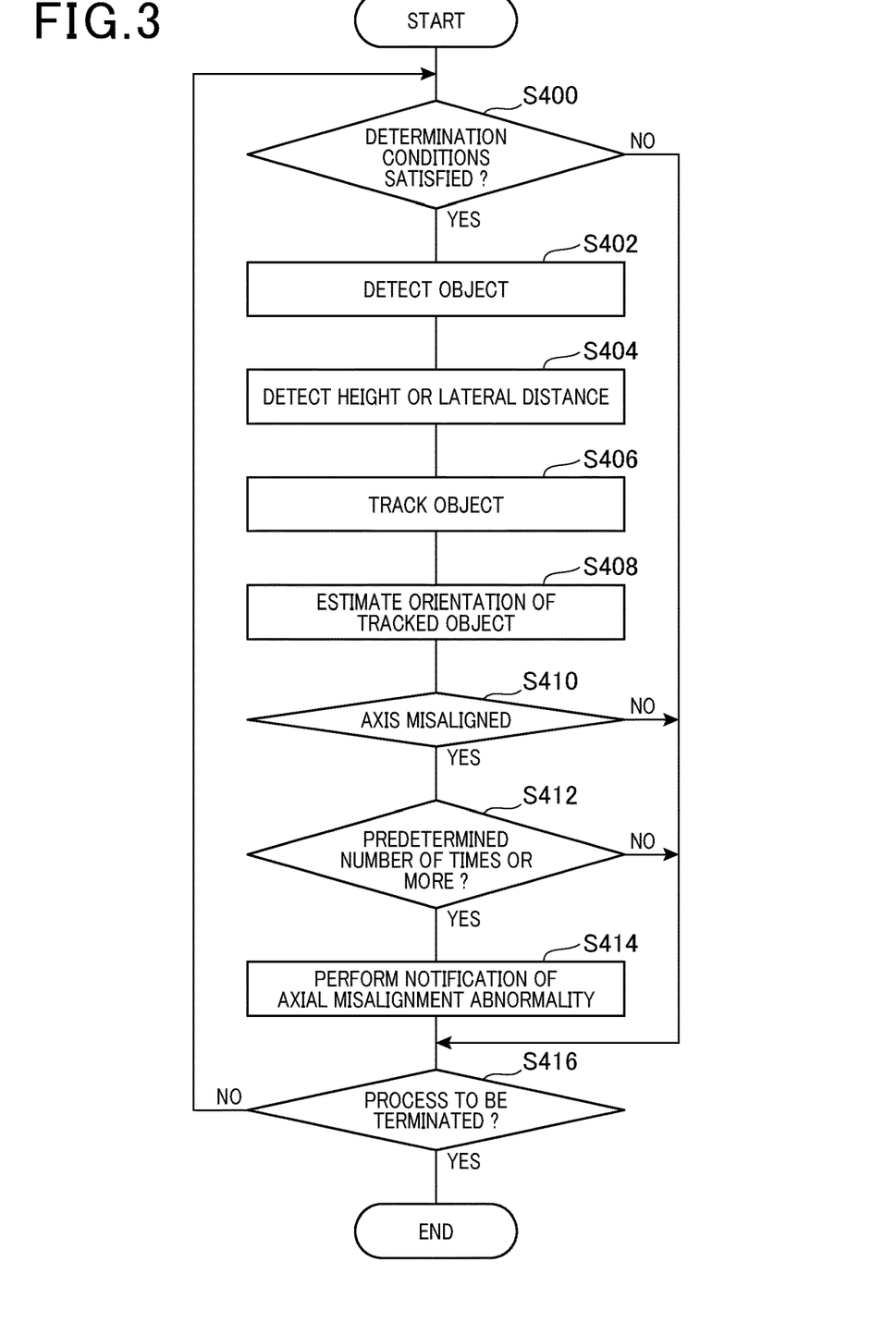
FIG. 3 is a flowchart showing an axial misalignment determination process.

Next, description will be made below on an axial misalignment determination process to be performed by the object-detecting device 10 with reference to a flowchart in FIG. 3.

In S400, the axial misalignment determiner 18 determines whether conditions for determination of the axial misalignment of the search wave sensor are satisfied. For example, the axial misalignment determiner 18 determines whether conditions that the vehicle 100 travels straight at a predetermined vehicle speed or more on a road surface of a flat straight road are satisfied as the conditions for determination of the axial misalignment based on image data captured by the camera 4, detection information acquired from an acceleration sensor, a vehicle speed sensor, and a yaw rate sensor, which are not shown, a current location of the vehicle 100 and map information acquired from a navigation device not shown, or the like.

If a determination result is No in S400, that is, the conditions for determination of the axial misalignment of the search wave sensor are not satisfied, the process proceeds to S416.

If the determination result is Yes in S400, that is, the conditions for determination of the axial misalignment of the search wave sensor are satisfied, the first detector 12 acquires detection information regarding detection of the different detection regions in the vicinity of the vehicle 100 from the five millimeter-wave radars 2, the camera 4, the LiDAR 6, and the sonar 8 in S402.

The first detector 12 then, for example, detects a distance R1 to the object 200 and an orientation θ of the object 200 relative to the vehicle 100 from the detection information from the millimeter-wave radars 2. The first detector 12 further detects a relative speed Vr of the object 200 relative to the vehicle 100 from the detection information from the millimeter-wave radars 2.

Figure 4:
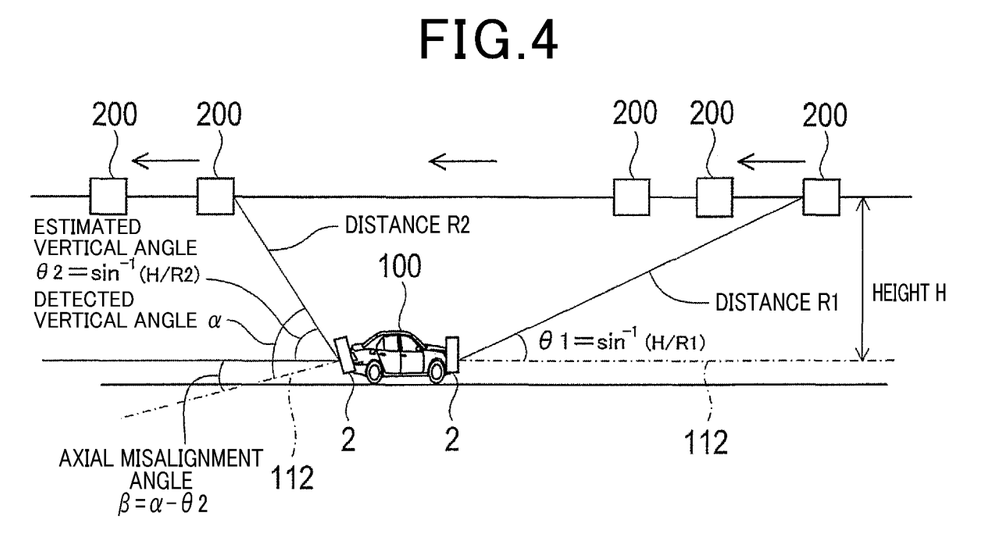
FIG. 4 is a schematic diagram showing determination of axial misalignment based on height information regarding the object.
Figure 5:
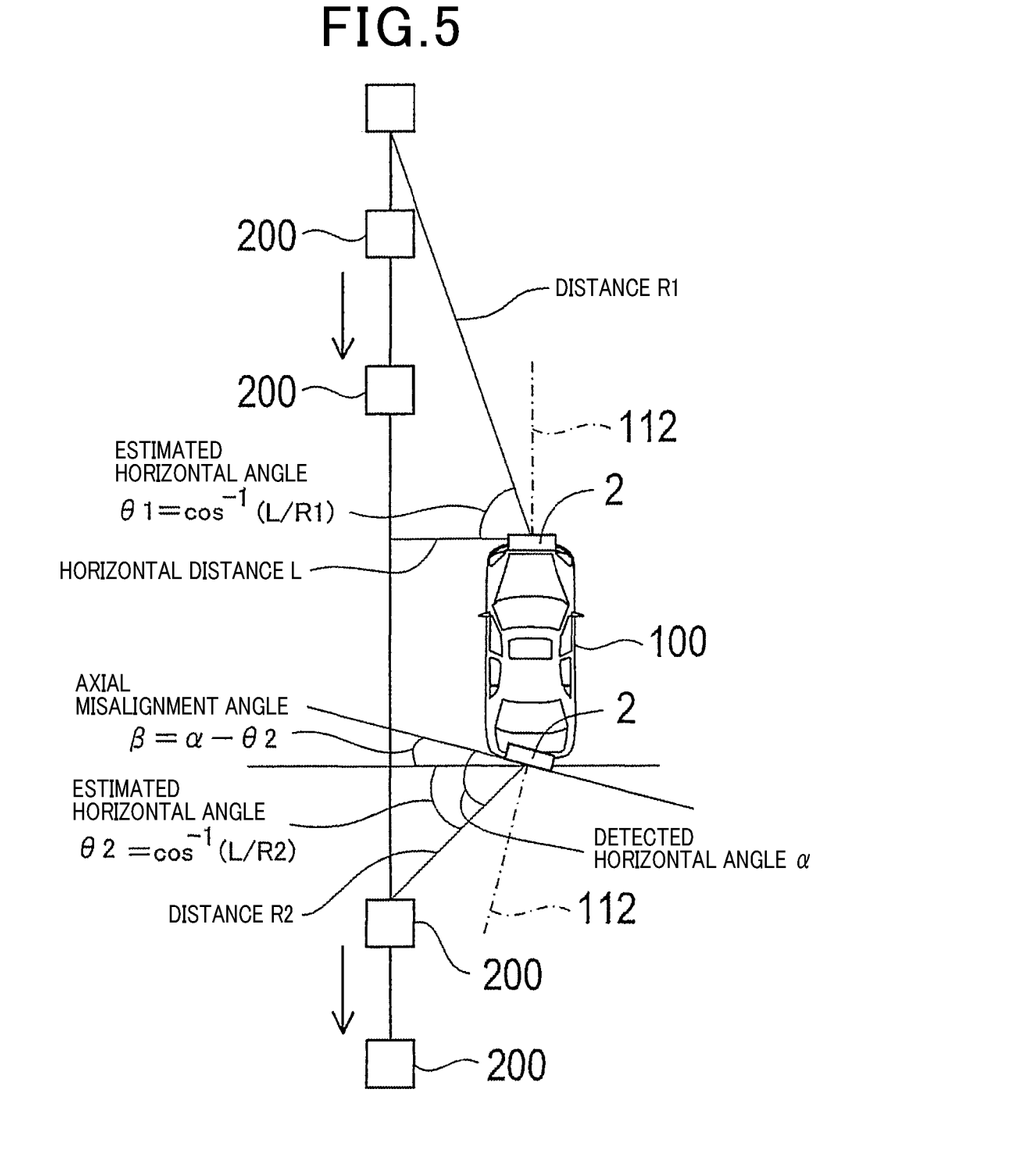
FIG. 5 is a schematic diagram showing determination of axial misalignment based on lateral distance information regarding the object.

In S404, the second detector 16, for example, detects a height H of the object 200 or a lateral distance L between the vehicle 100 and the object 200 in the lateral direction based on the detection information acquired from the millimeter-wave radar 2 located at the front-side middle of the vehicle 100 as shown in FIG. 4 or FIG. 5. In this case, it is assumed that the axial misalignment of the millimeter-wave radar 2 located at the front-side middle of the vehicle 100 has not occurred. It should be noted that the height of the object 200 may represent either the height of the object 200 existing above the vehicle 100 or the lowness of the object 200 existing below the vehicle 100.

It should be noted that in detecting the height H of the object 200 or the lateral distance L of the object 200, the use of the detection information acquired from the millimeter-wave radar 2 located at the front-side middle of the vehicle 100 is preferable. This is because the millimeter-wave radar 2 located at the front-side middle of the vehicle 100 can detect the object 200 for an increased number of times by virtue of a long detection distance to the object 200 present in front of the vehicle 100.

An increase in the number of times for which the object 200 can be detected improves accuracy of detection information when the detection information is averaged or the detection information is used with a maximum value and a minimum value excluded.

Further, with a plurality of millimeter-wave radars 2 located at the front-side middle of the vehicle 100, the height H or the lateral distance L of the object 200 can be detected with a high accuracy by calculating an average of the heights H or the lateral distances L of the object 200 based on the detection information acquired from the plurality of millimeter-wave radars 2.

In detecting the height H of the object 200, it is preferable that the object 200 be present at a level as high as possible or a level as low as possible with respect to the vehicle 100. This is because in determining whether axial misalignment of the millimeter-wave radar 2 in a vertical direction has occurred based on the height H of the object 200 in later-described S410, accuracy in estimating an angle of the object 200 in the vertical direction is improved when the object 200 is present at a level as high as possible or a level as low as possible with respect to the vehicle 100.

Further, in detecting the height H of the object 200, it is preferable that the object 200 be present within a vehicle width of the vehicle 100. This is because a reduction in influence of the angle of the object 200 in the lateral direction on the vehicle 100 as much as possible results in an improvement in accuracy in estimating the angle of the object 200 in the vertical direction.

In view of the above, in detecting the height H of the object 200, it is preferable that the object 200 be a guide sign or a manhole located on a road where the vehicle 100 travels.

The height H or the lateral distance L of the object 200 is calculated as follows. First, when Vr denotes the relative speed of the object 200 detected by the millimeter-wave radar 2, V denotes the vehicle speed of the vehicle 100, and θ1 denotes an angle in the vertical direction or the lateral direction as the orientation of the object 200 relative to the vehicle 100, the relative speed Vr of the object 200 is represented by the following expression (1) and the angle θ1 is represented by the following expression (2).

$$Vr = -V \cos \theta 1 \quad (1)$$

$$\theta 1 = \cos^{-1}(-Vr/V) \quad (2)$$

Further, when R1 denotes the distance between the vehicle 100 and the object 200 detected by the millimeter-wave radar 2, the height H of the object 200 is represented by the following expression (3) and the lateral distance L is represented by the following expression (4) from the distance R1 and the angle θ1 represented by the expression (2).

$$H = R1 \sin \theta 1 \quad (3)$$

$$L = R1 \cos \theta 1 \quad (4)$$

In S406, the object tracker 14 estimates the position of the object 200 reached after the elapse of the predetermined time based on the distance to the object 200 and the orientation of the object 200 and the relative speed of the object 200 relative to the vehicle 100. The object tracker 14 then identifies the object 200 present at a position matching the estimated position of the object 200 reached after the predetermined time as the same object 200. The object 200 detected in the different detection region 110 by the different detection sensor with the travel of the vehicle 100 can be identified as the same object 200.

Next, in S408, as shown in FIG. 4 or FIG. 5, the axial misalignment determiner 18 estimates the orientation of the object 200 relative to the vehicle 100 based on the height H or the lateral distance L of the object 200 detected in S404 and a distance R2 to the object 200 detected by one of the millimeter-wave radars 2 that is different in detection region 110 from the millimeter-wave radar 2 that detects the height H or the lateral distance L of the object 200 in S404 and in which axial misalignment has not occurred.

For example, as shown in FIG. 4, the axial misalignment determiner 18 estimates an angle θ2 of the object 200 in the vertical direction relative to the vehicle 100 by calculating it from the following expression (5) based on the height H of the object 200 determined from the detection information from the millimeter-wave radar 2 located at the front-side middle of the vehicle 100 by using the expression (3) and the distance R2 to the object 200 detected from the detection information from the millimeter-wave radar 2 located at the rear-side left of the vehicle 100.

$$\theta 2 = \sin^{-1}(H/R2) \tag{5}$$

In the expression (5), the height H is calculated from the expression (3) with a high accuracy. Further, the millimeter-wave radar 2 located at the rear-side left of the vehicle 100 can correctly detect the distance R2 irrespective of whether the detection axis 112 is misaligned. Therefore, the angle θ2 in the vertical direction estimated from the expression (5) is correct.

If the object 200 passes through the detection region 110 of the millimeter-wave radar 2 located at the front-side left, the distance R2 to the object 200 detected from the detection information from the millimeter-wave radar 2 located at the front-side left of the vehicle 100 may be used in the expression (5).

Further, as shown in FIG. 5, the axial misalignment determiner 18 estimates an angle θ2 of the object 200 in the lateral direction relative to the vehicle 100 by calculating it from the following expression (6) based on the lateral distance L of the object 200 determined from the detection information from the millimeter-wave radar 2 located at the front-side middle of the vehicle 100 by using the expression (4) and the distance R2 to the object 200 detected from the detection information from the millimeter-wave radar 2 located at the rear-side left of the vehicle 100.

$$\theta 2 = \cos^{-1}(L/R2) \tag{6}$$

In expression (6), the lateral distance L is calculated from the expression (4) with a high accuracy. Further, the millimeter-wave radar 2 located at the rear-side left of the vehicle 100 can correctly detect the distance R2 irrespective of whether the detection axis 112 is misaligned. Therefore, the angle θ2 in the lateral direction estimated from the expression (6) is correct.

If the object 200 passes through the detection region 110 of the millimeter-wave radar 2 located at the front-side left, the distance R2 to the object 200 detected from the detection information from the millimeter-wave radar 2 located at the front-side left of the vehicle 100 may be used in the expression (6).

In S410, the axial misalignment determiner 18 determines whether an axial misalignment angle β defined by a difference between the angle θ2 of the object 200, which is estimated from the expression (5) or (6) and shown in FIG. 4 or FIG. 5, and an angle α of an object detected from the detection information from the millimeter-wave radar 2 located at the rear-side left of the vehicle 100 is equal to or larger than a predetermined angle. In other words, the axial misalignment determiner 18 determines whether the detection axis 112 of the millimeter-wave radar 2 located at the rear-side left of the vehicle 100 is misaligned.

If a determination result is No in S410, that is, the detection axis 112 of the millimeter-wave radar 2 located at the rear-side left of the vehicle 100 is not misaligned, the process proceeds to S416.

If the determination result is Yes in S410, that is, the detection axis 112 of the millimeter-wave radar 2 located at the rear-side left of the vehicle 100 is misaligned, the axial misalignment determiner 18 determines whether axial misalignment of the millimeter-wave radar 2 located at the rear-side left of the vehicle 100 has occurred for a predetermined number of times or more in S412.

If a determination result is No in S412, that is, the number of times for which the axial misalignment of the millimeter-wave radar 2 located at the rear-side left of the vehicle 100 has occurred is less than the predetermined number of times, the process proceeds to S416.

If the determination result is Yes in S412, that is, the axial misalignment of the millimeter-wave radar 2 located at the rear-side left of the vehicle 100 has occurred for the predetermined number of times or more, the notification unit 20 records the fact that the axial misalignment of the millimeter-wave radar 2 located at the rear-side left of the vehicle 100 has occurred as diagnosis information and performs notification of axial misalignment abnormality by showing the axial misalignment on the display, by voice, or the like in S414.

The process from S400 to S414 is continued until an ignition switch or the like is turned off and termination of the axial misalignment determination process is determined in S416.

The object-detecting device 10 corrects an orientation of an object detected by the millimeter-wave radar 2 in which the detection axis 112 is misaligned with the axial misalignment angle β calculated in S410, thereby detecting the orientation of the object.

3. Effects

The above-described embodiment can achieve the following effects.

(1) The object-detecting device 10 estimates, based on the height H or the lateral distance L of the object 200 detected in the detection region 110 of a normal one of the millimeter-wave radars 2 in which axial misalignment has not occurred and the distance to the object 200 detected by another millimeter-wave radar 2 different in detection region 110 from the normal one of millimeter-wave radars 2, the orientation of the object 200 in the vertical direction or the lateral direction relative to the other millimeter-wave radar 2. The object-detecting device 10 determines whether axial misalignment of the other millimeter-wave radar 2 has occurred based on a difference between the estimated orientation and the orientation of the object 200 detected by the other millimeter-wave radar 2.

This enables determining whether axial misalignment of the millimeter-wave radar 2 has occurred based on the detection information from the normal one of the millimeter-wave radars 2 in which axial misalignment has not occurred even in a case where there is no overlap between the detection regions of the plurality of millimeter-wave radars 2.

(2) The axial misalignment determiner 18 determines whether axial misalignment of the millimeter-wave radar 2 has occurred when the vehicle 100 travels on a flat straight road at a predetermined vehicle speed or more, which makes it possible to reduce a variation in detection accuracy among the detection sensors including the millimeter-wave radars 2. As a result, it is possible to determine whether axial misalignment of the millimeter-wave radar 2 has occurred with a high accuracy based on the detection information from the detection sensors with a less variation.

In the above-described embodiment, the millimeter-wave radars 2, the camera 4, the LiDAR 6, and the sonar 8 correspond to the detection sensors, the millimeter-wave radars 2, the LiDAR 6, and the sonar 8 among the detection sensors correspond to the search wave sensors, and the vehicle 100 corresponds to the moving body.

Further, S402 corresponds to a process of the first detector 12, S404 corresponds to a process of the second detector 16, S406 corresponds to a process of the object tracker 14, S408 to S412 correspond to a process of the axial misalignment determiner 18, and S414 corresponds to a process of the notification unit 20.

4. Other Embodiments

Although the embodiment of the present disclosure is described above, the present disclosure is not limited to the above-described embodiment and may be implemented with a variety of modifications.

(1) In the above-described embodiment, the height H or the lateral distance L of the object 200 is detected based on the detection information from normal one of the millimeter-wave radars 2 in which axial misalignment has not occurred. In this regard, the height H or the lateral distance L of the object 200 may be detected by any one of the normal camera 4, LiDAR 6, and the sonar 8.

(2) A target for determining whether axial misalignment has occurred, i.e., the search wave sensor that searches the vicinity of the vehicle 100 with a search wave, is not limited to the millimeter-wave radar 2 and may be the LiDAR 6 or the sonar 8.

(3) A plurality of functions of one component in the above-described embodiment may be implemented by a plurality of components and one function of one component may be implemented by a plurality of components. In addition, a plurality of functions of a plurality of components may be implemented by one component and one function implemented by a plurality of components may be implemented by one component. In addition, the configuration of the above-described embodiment may be partly omitted. In addition, at least a part of the configuration of the above-described embodiment may be added to or replaced with the configuration of another above-described embodiment. It should be noted that any mode included in a technical idea determined from wordings in claims should be an embodiment of the present disclosure.

(4) The present disclosure can be implemented in various forms such as, in addition to the above-described object-detecting device 10, a system including the object-detecting device 10 as a component, a program for enabling a computer to function as the object-detecting device 10, a non-transitory substantive recording medium storing the program, and an object detection method.

What is claimed is:

1. An object-detecting device comprising:
a first detector configured to detect, based on detection information acquired from each of a plurality of detection sensors installed in a moving body and having different detection regions for detection targets in a vicinity of the moving body, a distance between the moving body and an object present in the detection region and an orientation of the object relative to the moving body, the detection sensors including at least one search wave sensor that searches the detection region around a detection axis with a search wave;
an object tracker configured to track, based on the detection information, the same object passing through the different detection regions as the moving body travels;
a second detector configured to detect, based on the detection information, at least either one of a height of the object tracked by the object tracker or a lateral distance between the moving body and the object in a lateral direction as object information; and
an axial misalignment determiner configured to determine whether the detection axis of the search wave sensor is misaligned based on, regarding the same object tracked by the object tracker, the distance and the orientation of the object detected by the first detector based on the detection information from the search wave sensor and the object information detected in the detection region different from the detection region of the search wave sensor by the second detector.

2. The object-detecting device according to claim 1, wherein
the axial misalignment determiner is configured to estimate the orientation of the object based on the distance of the object detected by the first detector and the object information detected by the second detector and determine whether the detection axis is misaligned based on a difference between the estimated orientation and the orientation of the object detected by the first detector based on the detection information from the search wave sensor.

3. The object-detecting device according to claim 1, wherein
the detection sensors include at least one radar as the search wave sensor, and
the second detector is configured to detect the object information based on the detection information acquired from each of the detection sensors other than the radar.

4. The object-detecting device according to claim 1, further comprising:
a notification unit configured to perform notification of axial misalignment abnormality when the axial misalignment determiner determines that the detection axis is misaligned.

5. The object-detecting device according to claim 1, wherein
the axial misalignment determiner is configured to determine whether the detection axis is misaligned based on a height of the object being present within a width of the moving body detected by the second detector.

6. The object-detecting device according to claim 1, wherein
the axial misalignment determiner is configured to determine whether the detection axis is misaligned when the moving body travels on a flat road surface.

7. The object-detecting device according to claim 1, wherein
the axial misalignment determiner is configured to determine whether the detection axis is misaligned when the moving body travels straight.

8. The object-detecting device according to claim 1, wherein
the axial misalignment determiner is configured to determine whether the detection axis is misaligned when the moving body travels at a predetermined speed or more.

9. The object-detecting device according to claim 1, wherein
the second detector is configured to detect the object information based on a travel speed of the moving body and a relative speed of the object relative to the moving body acquired from a radar as the search wave sensor.

10. The object-detecting device according to claim 1, wherein
the axial misalignment determiner is configured to determine whether the detection axis is misaligned based on an axial misalignment angle of the detection axis, and
the first detector is configured to correct the orientation of the object detected by the search wave sensor in which axial misalignment has occurred based on the axial misalignment angle of the detection axis determined to be misaligned by the axial misalignment determiner.

\* \* \* \* \*